July 7, 1931.  T. CRABTREE  1,813,443

PACKING NUT FOR DOORCHECKS AND THE LIKE

Filed July 1, 1930

Inventor
Thomas Crabtree
By Attorneys
Southgate Fay & Hanley

Patented July 7, 1931

1,813,443

UNITED STATES PATENT OFFICE

THOMAS CRABTREE, OF WORCESTER, MASSACHUSETTS, ASSIGNOR TO INDEPENDENT LOCK COMPANY, OF FITCHBURG, MASSACHUSETTS, A CORPORATION OF MASSACHUSETTS

PACKING NUT FOR DOORCHECKS AND THE LIKE

Application filed July 1, 1930. Serial No. 465,157.

This invention relates to a nut in disc form adapted to be used between two spaces in a mechanical device, such as a door check to prevent oil or liquid from passing from one space to the other.

The principal objects of the invention are to provide a simplified and less expensive form of nut than has heretofore been employed; to provide a construction adapted to be formed of sheet metal instead of a casting and requiring less finish on the surface and one that will more fully prevent passage of oil through it and to avoid the porosity of the malleable iron castings which are used as packing nuts for separating the two chambers of door checks, thus preventing the seepage of liquid in the spring chamber.

Other objects and advantages of the invention will appear hereinafter.

Reference is to be had to the accompanying drawings in which

Figure 1:
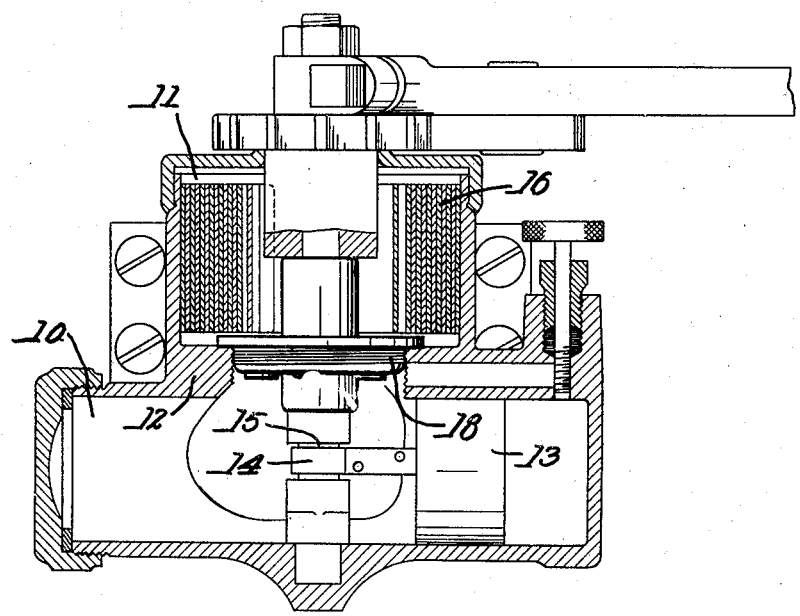
Fig. 1 is a central sectional view of a door check with a preferred embodiment of this invention applied thereto.

Although this invention is shown as applied to a door check, it is capable of other uses for analagous purposes. In a door check, such as shown, there is a chamber 10 and a chamber 11. These two spaces or chambers are separated from each other by a wall 12. The chamber 10 is cylindrical as it receives the dashpot piston 13 which is connected with a crank 14 on a shaft 15. On the same shaft but in the chamber 11 is the usual spring 16 for operating the door check. Between the two chambers there has to be placed a nut 18 which constitutes a bearing for the shaft 15 and which has to separate the two chambers fully because the oil which is located in the chamber 10 has to be kept away from the spring. Ordinarily a solid nut cast from grey or malleable iron is employed for this purpose. This nut has to stand a terrific strain. Furthermore, malleable or grey iron castings are somewhat porous ordinarily and in such cases the liquid seeps into the spring chamber, leaving the chamber 10. This causes the check to become useless and defective after it has been in operation for a period of time.

According to the present invention the nut is made of two pieces of pressed steel. Therefore it is a great improvement over the malleable iron nut because of its increased strength. Furthermore the liquid will not seep through the metal in this case. The present nut is formed, as stated, of two pressed metal parts secured together by heavy steel rivets which are closed under heavy pressure. These rivets not only act as a means for holding the two parts of the nut solidly but also act as guides for the assembling spanner used in securing the combination packing nut in position.

Figure 2:
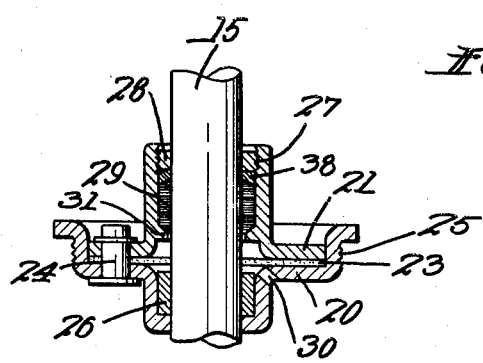
Fig. 2 is a sectional view on the same plane of the packing nut constructed in accordance with this invention.
Figure 3:
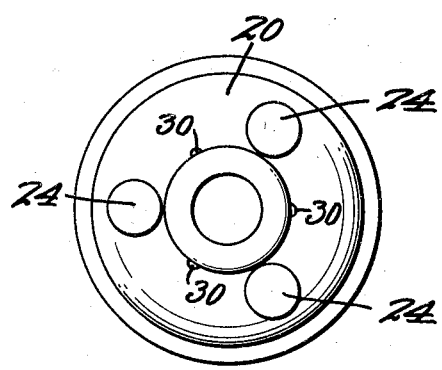
Figs. 3 and 4 are opposite end views of the packing nut.
Figure 4:
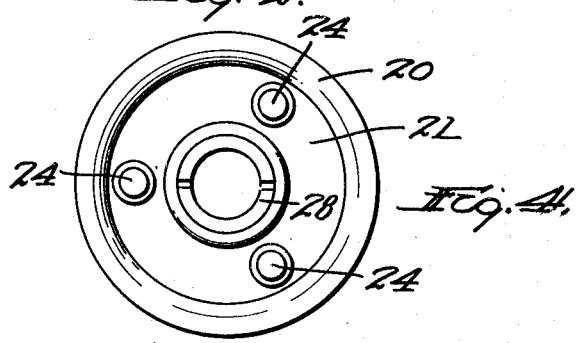

The two stamped sheet steel parts 20 and 21 are formed in the shape shown in Fig. 2 with two annular portions fitting together and of the same size and adapted to hold between them a thin fiber washer 23, to prevent the leakage of oil outward from the shaft through the upper side of the packing unit. These two annular parts of the nut are secured together by three rivets 24 under heavy pressure. The heads of these rivets on one side, projecting out, constitute a means by which a spanner having three openings of the same size and location may be employed for the purpose of assembling the nut in the wall 12. For this purpose a cylindrical surface on the member 20 of the nut is screw-threaded at 25 to screw into the wall 12.

The shaft 15 is provided with a bronze bearing 26 in the cylindrical central part of the member 20 and the shoulder thereon serves as a position stop for the bearing. The member 21 is provided with a cylindrical hollow projection at the center screw-threaded at 27 on the inside to receive a nut 28. Under it is a packing gland 38 holding packing 29 under it surrounding the shaft 15. The parts 28 and 38 are bronze and constitute a bearing for the shaft. The interior of this hollow projection has an inwardly extending wall 31 to hold the packing. An opening 30 is provided in the shell 20 for the purpose of allowing any oil getting into the space back of the bearing 26 to drain back into the chamber. Preferably three of these drain openings 30 are provided so that one will always be at the bottom.

The two bearings 26 and 28–38 are spaced far apart and a packing that can be further compressed in case of wear prevents oil passing through the outer one into the spring chamber.

It will be understood, of course, that while this invention is particularly adapted for use as a substitute for the ordinary packing nut of a door check and is so shown in the drawings, it is capable of other uses where the desired conditions are the same. Although I have illustrated and described only a single form of the invention I am aware of the fact that changes can be made therein by any person skilled in the art without departing from the scope of the invention as expressed in the claims.

Therefore I do not wish to be limited to the exact form shown, but what I do claim is:—

1. As an article of manufacture, a packing nut comprising two pieces of pressed metal, each having an annular portion, means for securing them together in registration with each other, a washer located between the two annular portions and compressed between them by the application of the rivets, one of said sheet metal parts having a packing box therein, and a shaft passing through the packing nut and packing box and rotatably mounted therein.

2. As an article of manufacture, a packing nut comprising two pieces of pressed metal, each having an annular portion, said portions being of the same size, a series of rivets extending through the annular portions to secure them together in registration with each other, a non-metallic, non-absorbent washer located between the two annular portions and compressed between them by the application of the rivets, one of said sheet metal parts having a projecting cylindrical central part, a packing box therein, and a shaft passing through the packing nut and packing box and rotatably mounted therein.

3. An article of manufacture, a packing nut comprising a pressed metal member having a cylindrical wall provided with a screw-thread for use in mounting it in place, and also having an annular flat wall inside the screw-threaded portion and a cylindrical portion at the center having packed therein, a shaft passing through the cylindrical portion and packing, and a second sheet metal member fitting within the screw-threaded portion of the first member and having a flat annular portion riveted to the flat annular wall, said first member having drain openings therein.

4. As an article of manufacture, a packing nut comprising a pressed metal member having a cylindrical wall provided with an external screw-thread for use in mounting it in an opening in a wall and having an annular wall inside the screw-threaded portion, and a cylindrical portion at the center, a packing therein, a shaft passing through the cylindrical portion and packing, a second sheet metal member fitting within the screw-threaded portion of the first member and having an annular portion riveted to the first named annular portion, said second sheet metal member having a cylindrical hollow projection at the center, and a packing means located within it and capable of being adjusted to increase the resistance to the passage of liquid and engaging the said shaft.

5. In a packing nut, the combination with two stamped sheet steel parts secured together, one surrounding the edge of the other and having an external screw thread, both parts having central cylindrical projections extending in opposite directions, one having a shoulder at the end, a bearing abutting against the shoulder at one end of the nut, a packing box in the other projection, and an adjustable nut in the latter projection for holding and compressing the packing and constituting a bearing for the same shaft at the other extreme end of the nut.

6. As an article of manufacture, a packing nut comprising a pressed metal member having a cylindrical wall provided with a screw-thread for use in mounting it in place, and also having a wall inside the screw-threaded portion and a cylindrical portion at the center having packing therein, a shaft passing through the cylindrical portion and packing, and a second sheet metal member secured to the first named member, the lower member having drain openings therein.

In testimony whereof I have hereunto affixed my signature.

THOMAS CRABTREE.